US012692716B2

(12) United States Patent
Deng

(10) Patent No.: US 12,692,716 B2
(45) Date of Patent: Jul. 28, 2026

(54) BATTERY INSTALLATION STRUCTURE FOR SWIMMING POOL ROBOT AND SWIMMING POOL ROBOT

(71) Applicant: Shenzhen Seauto Technology Co., Ltd., Shenzhen (CN)

(72) Inventor: Zhuoming Deng, Shenzhen (CN)

(73) Assignee: Shenzhen Seauto Technology Co., Ltd., Shenzhen (CN)

( * ) Notice: Subject to any disclaimer, the term of this patent is extended or adjusted under 35 U.S.C. 154(b) by 683 days.

(21) Appl. No.: 18/011,074

(22) PCT Filed: Oct. 24, 2022

(86) PCT No.: PCT/CN2022/126876
§ 371 (c)(1),
(2) Date: Dec. 16, 2022

(87) PCT Pub. No.: WO2024/077656
PCT Pub. Date: Apr. 18, 2024

(65) Prior Publication Data
US 2024/0328185 A1     Oct. 3, 2024

(30) Foreign Application Priority Data
Oct. 11, 2022    (CN) ......................... 202222668048.2

(51) Int. Cl.
*E04H 4/16*       (2006.01)
*B60L 53/80*     (2019.01)
*B63G 8/00*      (2006.01)

(52) U.S. Cl.
CPC ............ *E04H 4/1654* (2013.01); *B60L 53/80* (2019.02); *B63G 8/001* (2013.01); *B60L 2200/32* (2013.01); *B63G 2008/002* (2013.01)

(58) Field of Classification Search
None
See application file for complete search history.

(56) References Cited

U.S. PATENT DOCUMENTS

| | | | | |
|---|---|---|---|---|
| 5,351,355 A * | 10/1994 | Chiniara | ............... | E04H 4/1654 15/1.7 |
| 5,454,129 A * | 10/1995 | Kell | ...................... | E04H 4/1654 15/319 |
| 10,294,686 B1 * | 5/2019 | Erlich | .................. | B63H 11/107 |
| 12,331,542 B2 * | 6/2025 | Wang | ........................ | E04H 4/16 |
| 2022/0220761 A1 * | 7/2022 | Lancry | .................. | E04H 4/1654 |

* cited by examiner

*Primary Examiner* — Kayla Mccaffrey
(74) *Attorney, Agent, or Firm* — ScienBiziP, P.C.

(57) ABSTRACT

A battery installation structure includes a base; a control module, detachably mounted in the base; and a battery, detachably mounted on a bottom of the base, and detachably connected to the control module, wherein the bottom of the base protrudes upward to form a battery installation member, the battery installation member is configured for mounting the battery, and the top of the battery installation member is open, the bottom of the battery installation member is defined with an accommodating groove for accommodating the battery.

10 Claims, 10 Drawing Sheets

10

BATTERY INSTALLATION STRUCTURE FOR SWIMMING POOL ROBOT AND SWIMMING POOL ROBOT

TECHNICAL FIELD

The disclosure relates to the technical field of robots, and in particular, to a battery installation structure for a swimming pool robot and the swimming pool robot.

BACKGROUND

Swimming pool cleaning is generally divided into two types: one is to filter water of the swimming pool by a water filtering machine, and the other is to clean dirt on the bottom and side walls of the swimming pool by a robot.

A swimming pool robot generally comprises a control module and a battery for supplying power to the control module. Currently, the control module and the battery are generally fixedly mounted in a base. Such an installation structure is inconvenient to disassemble and maintain, and the space utilization is optimized, the overall cost is high. Since a battery tunnel is usually at a central position of the battery, reversely connecting the positive and negative terminals of the battery in error can be easily made.

SUMMARY OF INVENTION

A main object of the present disclosure is to provide a battery installation structure for a swimming pool robot and the swimming pool robot, which are intended to achieve easy installation and removal of the battery and the control module, reduce production costs, and avoid a reversal of connection between the control module and a positive electrode and a negative electrode of a battery.

To achieve the above purpose, the present disclosure provides a battery installation structure for a swimming pool robot, the battery installation structure including: a base; a control module, detachably mounted in the base; and a battery, detachably mounted on a bottom of the base, and detachably connected to the control module, wherein the bottom of the base protrudes upward to form a battery installation member for mounting the battery, and the top of the battery installation member is open, the bottom of the battery installation member is defined with an accommodating groove for accommodating the battery.

A further technical solution of the present disclosure is that a tunnel is arranged on the battery, the tunnel is located at one side of a middle line of the battery, and an interface connector corresponding to the tunnel is arranged on the bottom of the control module; or an interface connector is arranged on the battery, the interface connector is located at one side of a middle line of the battery, and a tunnel corresponding to the interface connector is arranged on the bottom of the control module.

A further technical solution of the present disclosure is that a first waterproof sealing ring is arranged around the tunnel.

A further technical solution of the present disclosure is that a second waterproof sealing ring is arranged around the interface connector.

A further technical solution of the present disclosure is that the first waterproof sealing ring is made of a soft glue, the second waterproof sealing ring is made of one or more circles of a hard glue, and the second waterproof sealing ring presses against the first waterproof sealing ring to achieve a waterproof effect, or the first waterproof sealing ring is made of one or more circles of the hard glue, the second waterproof sealing ring is made of the soft glue, and the first waterproof sealing ring presses against the second waterproof sealing ring.

A further technical solution of the present disclosure is that a mounting portion protrudes downwards from the bottom of the control module, and a mounting trough configured for accommodating the mounting portion is defined between the mounting portion and an inner front wall of the base.

A further technical solution of the present disclosure is that one side of the mounting portion is a number 7-shaped structure, the other side of the mounting portion is an arc shape, and a front wall of the base is a curved structure corresponding to the arc shape.

To achieve the above purpose, the present disclosure also proposes a swimming pool robot comprising a battery installation structure for the swimming pool robot as described above.

The battery installation structure for the swimming pool robot of the present disclosure has the following beneficial effects. Through the above technical scheme, the present disclosure comprises the base, the control module and the battery, the control module is detachably mounted in the base, and the battery is detachably mounted at the bottom of the base, the battery is detachably connected to the control module, and the mounting portion for mounting the battery is formed by protruding upwards from the bottom of the base, the top of the mounting portion is open, and the bottom of the mounting portion is defined with an accommodating groove for accommodating the battery. The present disclosure not only has a reasonable spatial layout, facilitates installing and disassembling the battery and the control module, reduces production costs, but also prevents the control module from being reversely connected to the anode and the cathode of the battery, improving the usage security and the service life.

BRIEF DESCRIPTION OF DRAWINGS

To describe the technical solutions in the embodiments of the present disclosure or in the prior art more clearly, the following briefly introduces the drawings required for describing the embodiments or the prior art. The drawings in the following description are only some embodiments of the present disclosure, other embodiments may also be obtained according to structures shown in these drawings without creative efforts.

DETAILED DESCRIPTION

The technical solutions in the embodiments of the present disclosure will be described clearly and completely below in combination with the drawings in the present disclosure. The described embodiments are only part of the embodiments of the present disclosure. Based on the embodiments of the present disclosure, all other embodiments obtained by ordinary technicians in the field without creative work belong to the scope of protection of the present disclosure.

Figure 1:
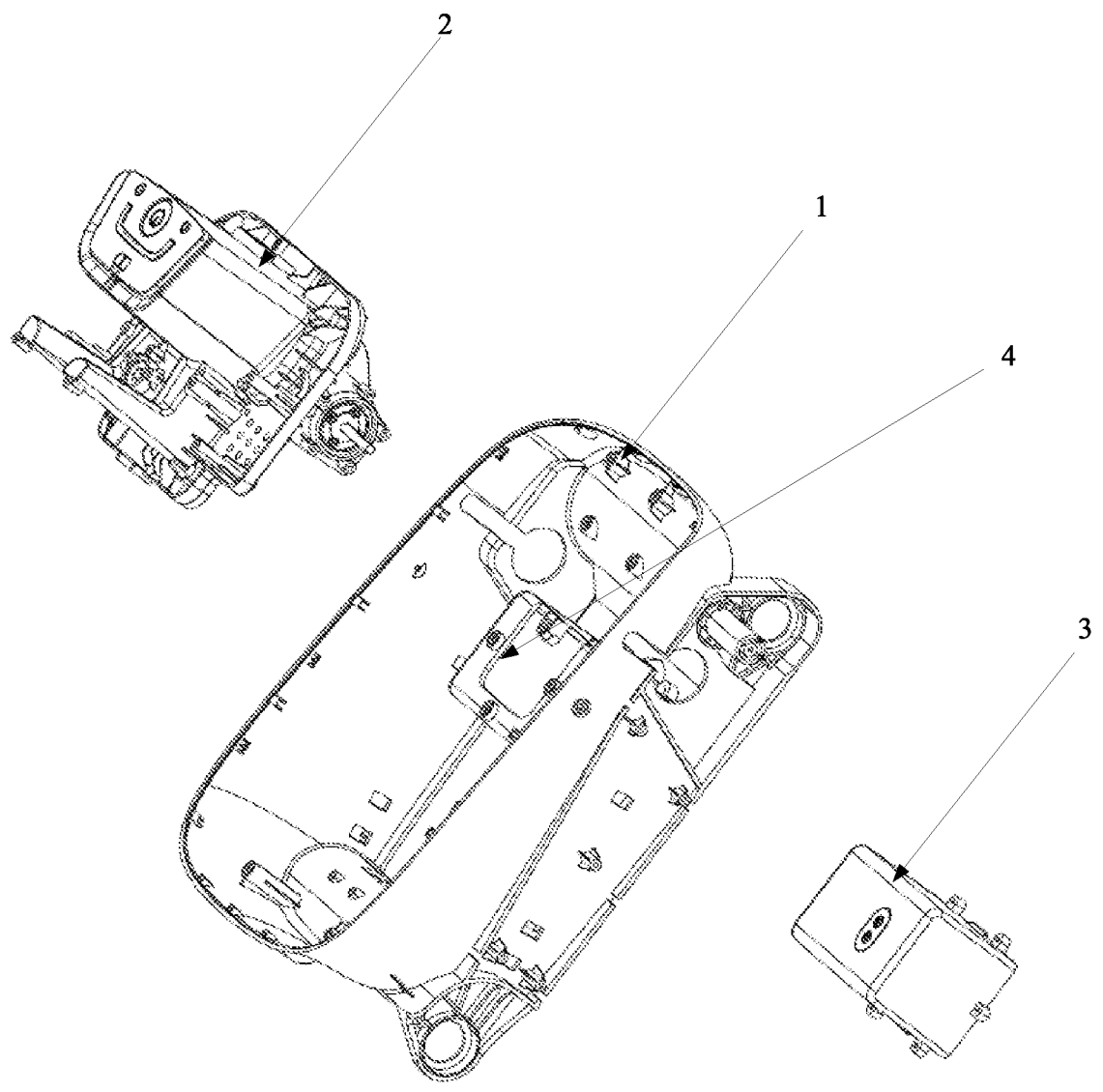
FIG. 1 is a schematic diagram of a first angle of a battery installation structure of a swimming pool robot according to a preferred embodiment of the present disclosure.
Figure 2:
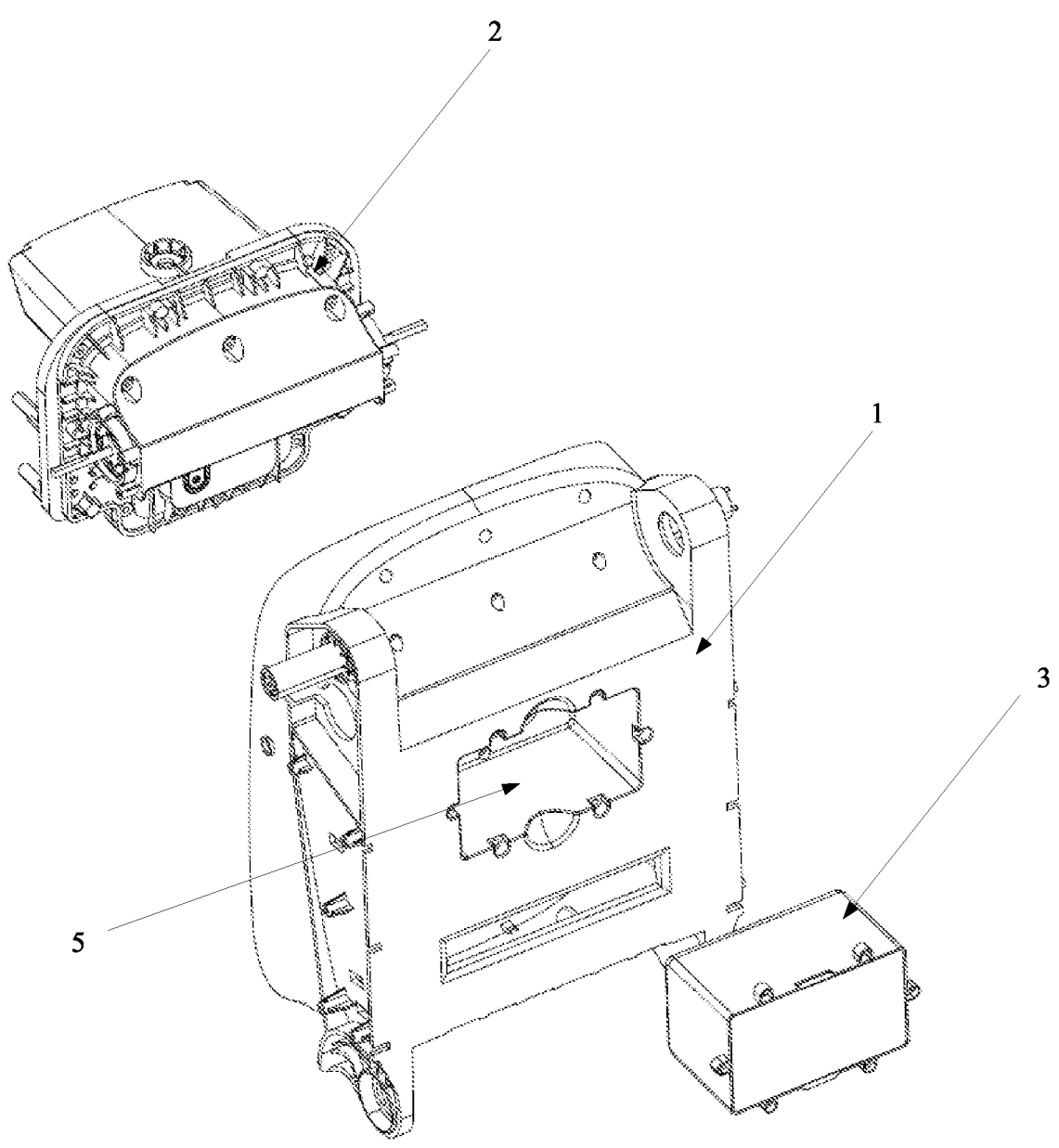
FIG. 2 is a schematic diagram of a second angle of the battery installation structure of the swimming pool robot according to a preferred embodiment of the present disclosure.
Figure 3:
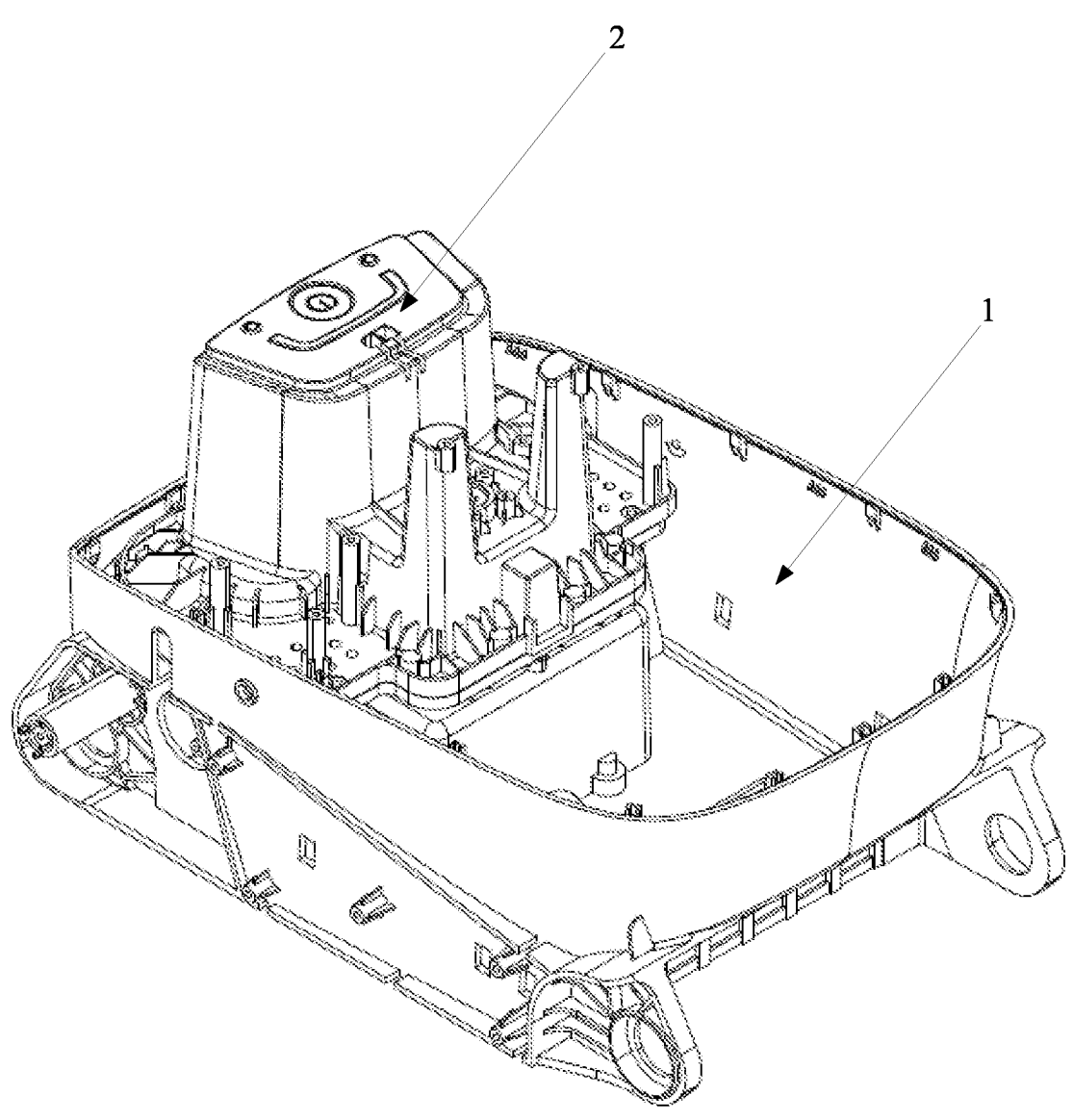
FIG. 3 is an overall structural diagram of the battery installation structure of the swimming pool robot according to a preferred embodiment of the present disclosure.
Figure 4:
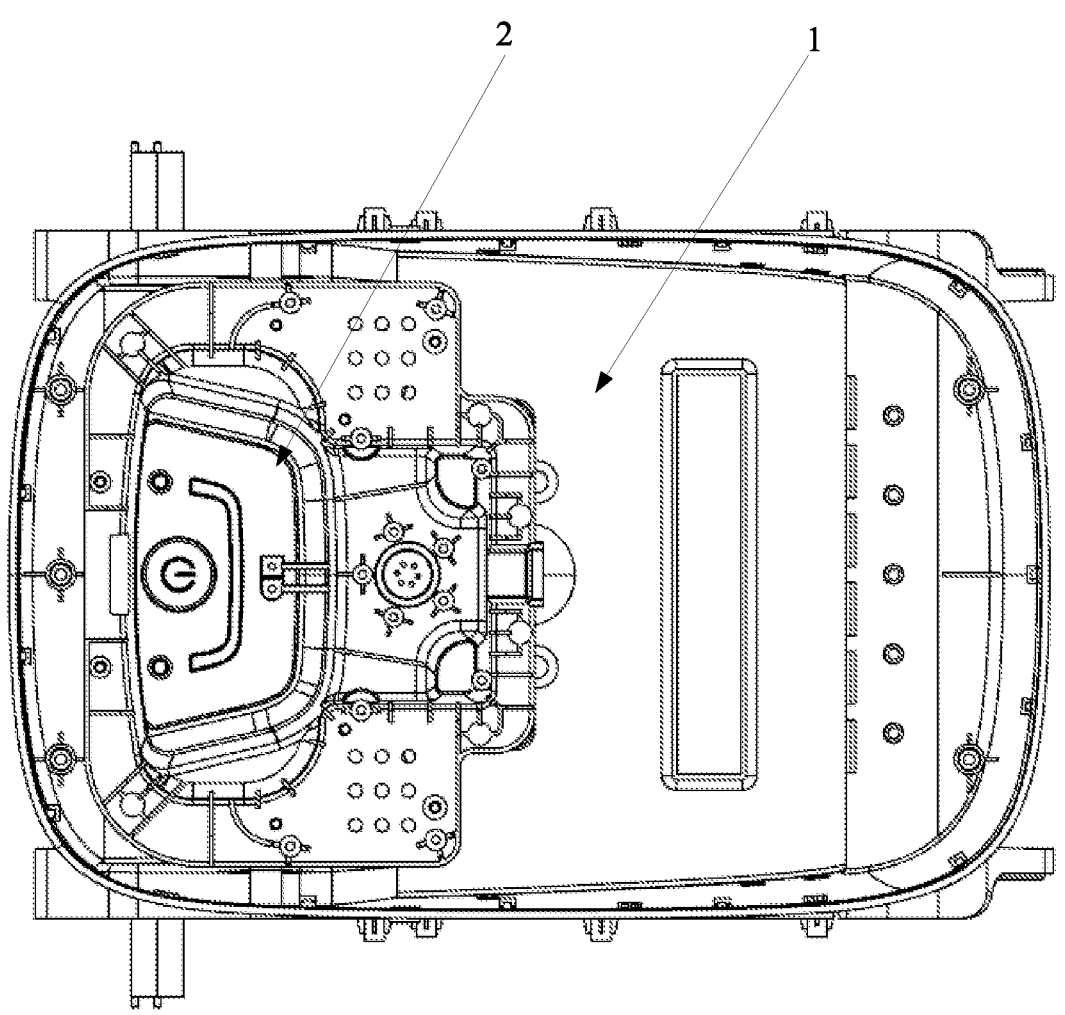
FIG. 4 is a top view of the battery installation structure of the swimming pool robot according to a preferred embodiment of the present disclosure.
Figure 5:
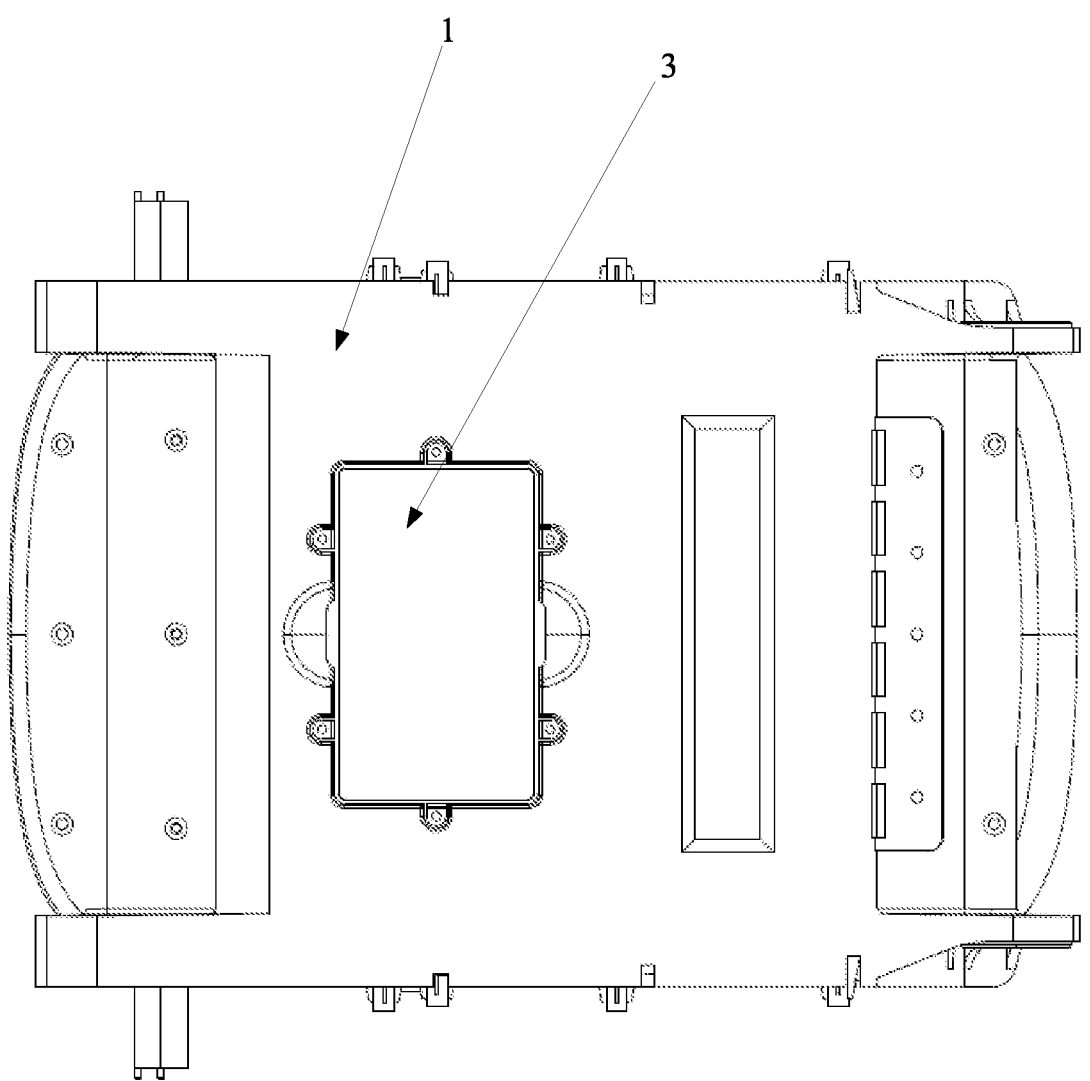
FIG. 5 is a bottom view of the battery installation structure of the swimming pool robot according to a preferred embodiment of the present disclosure.
Figure 6:
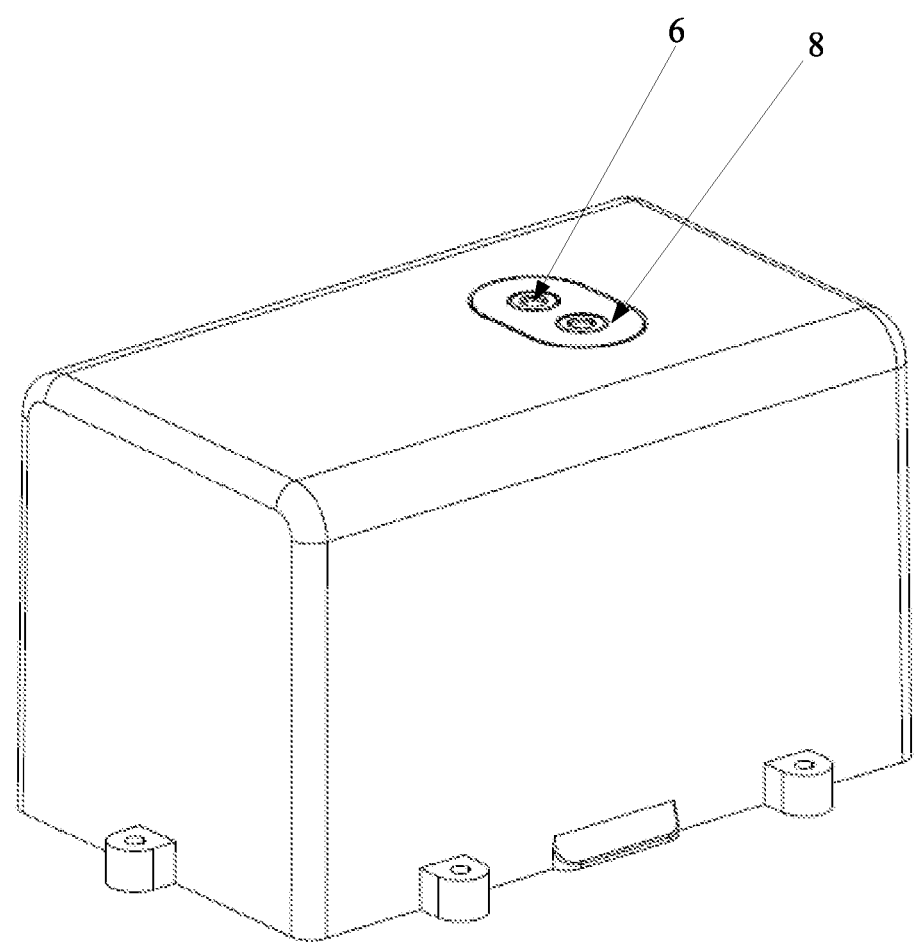
FIG. 6 is an overall schematic structural diagram of a battery of the swimming pool robot.
Figure 7:
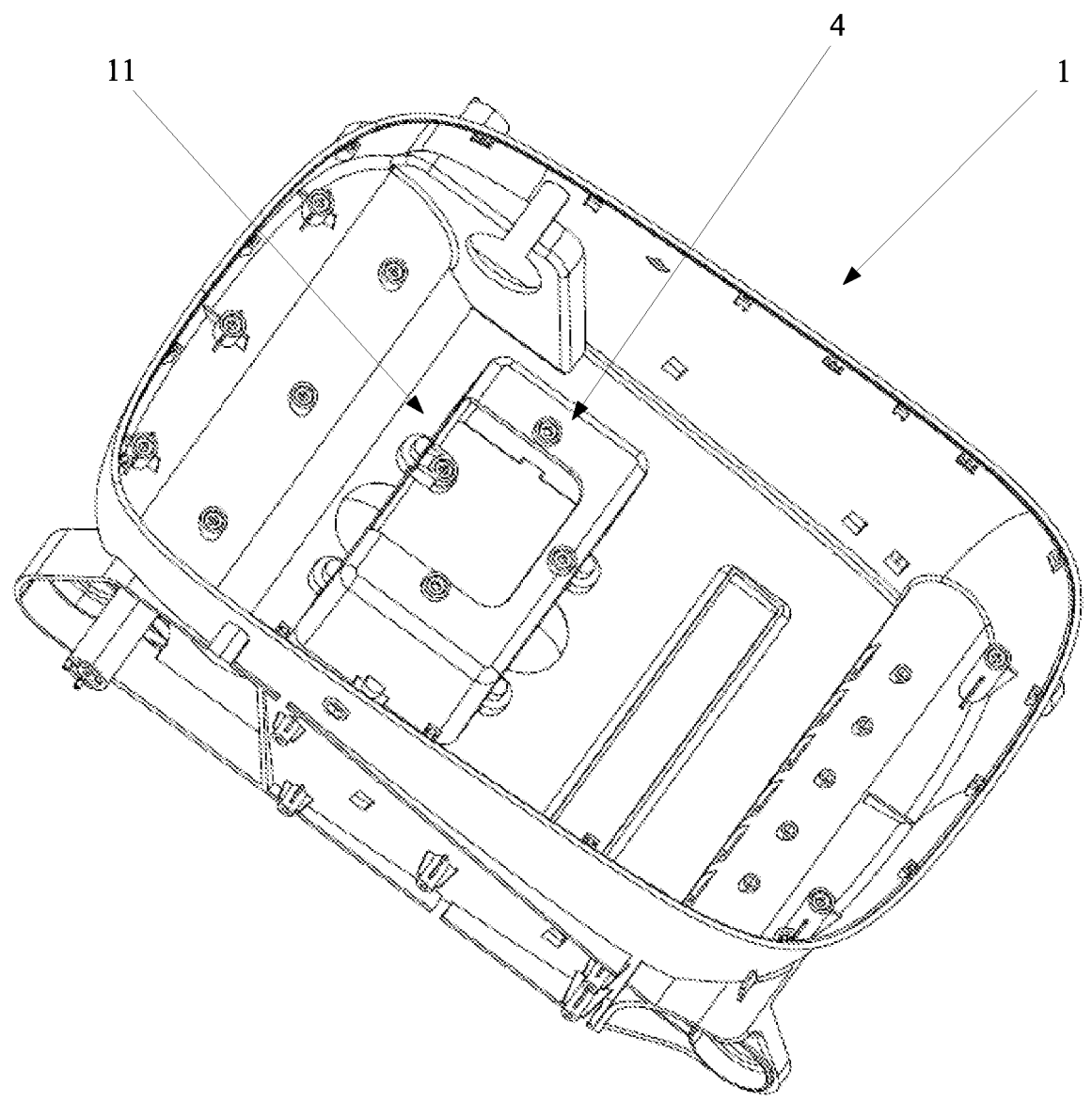
FIG. 7 is an overall schematic structural diagram of a base of the swimming pool robot.
Figure 8:
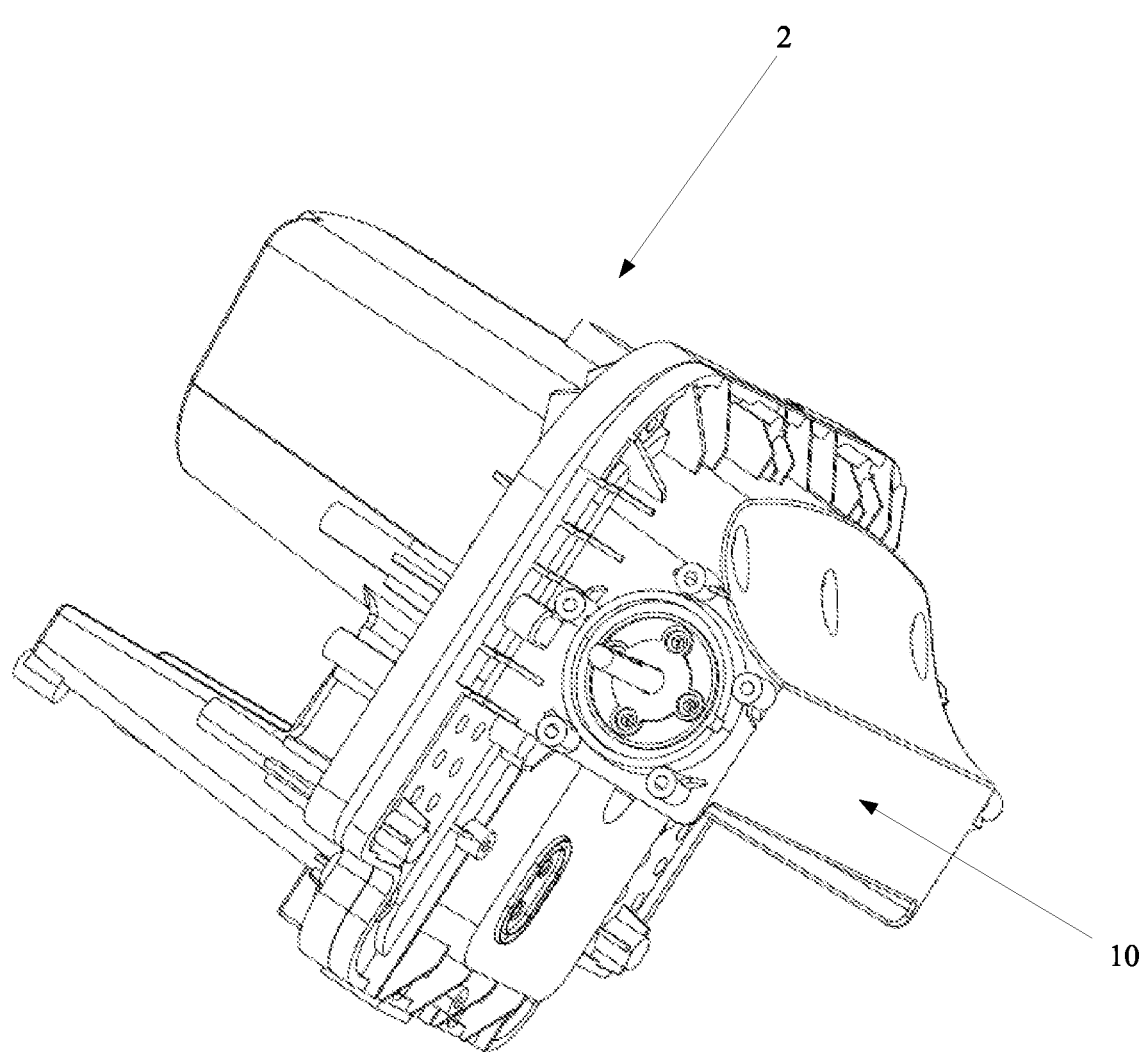
FIG. 8 is a structural diagram wherein a control module is positioned in the first angle.
Figure 9:
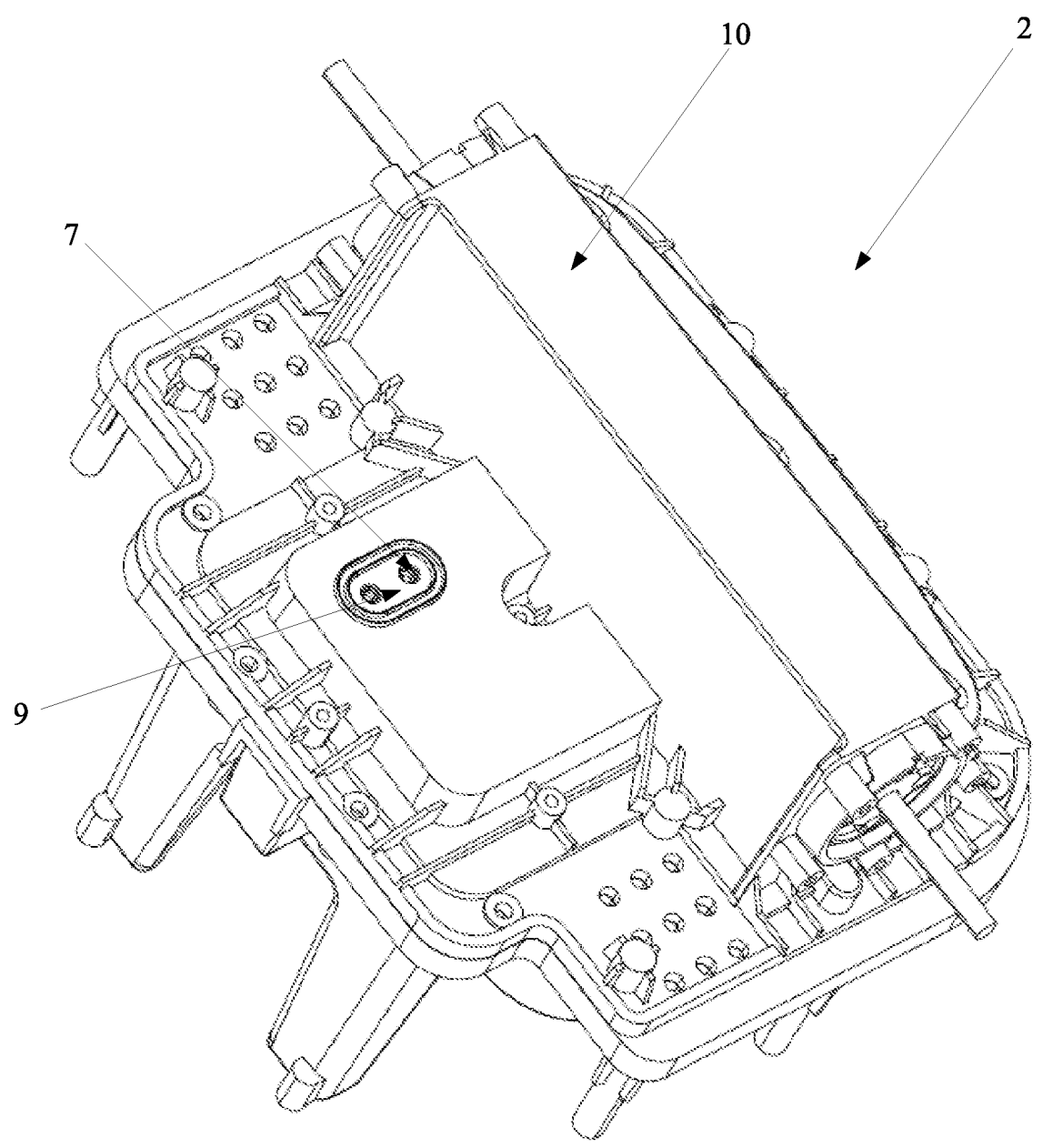
FIG. 9 is a structural diagram wherein a control module is positioned in the second angle.
Figure 10:
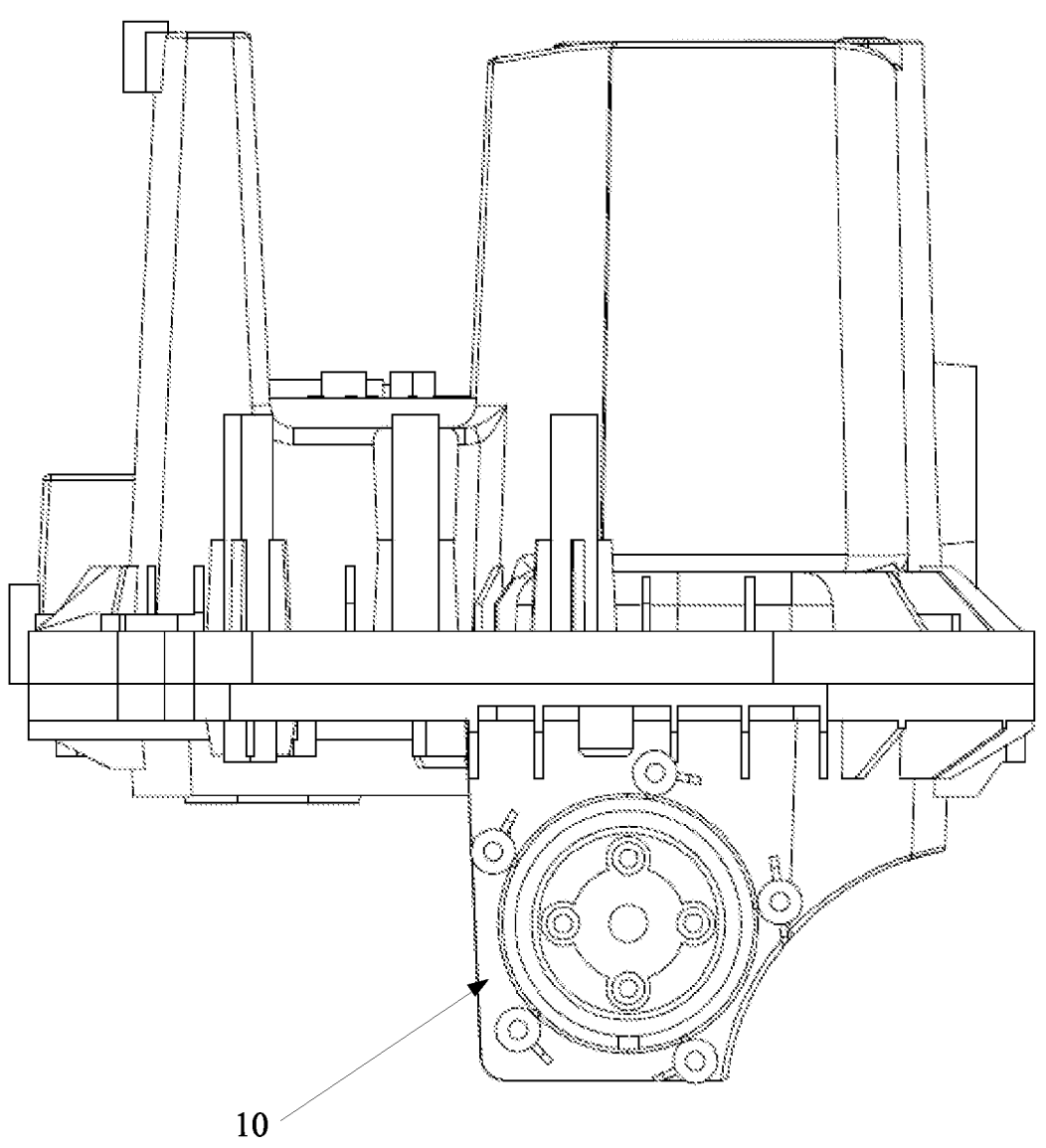
FIG. 10 is a front view of the control module.

Referring to FIGS. 1 to 10, the present disclosure provides a battery installation structure for a swimming pool robot. The battery installation structure for the swimming pool robot of a preferable embodiment of the present disclosure comprises a base 1, a control module 2 and a battery 3. The control module 2 is detachably mounted in the base 1, the battery 3 is detachably mounted at a bottom of the base 1, and the battery 3 is detachably connected to the control module 2.

The bottom of the base 1 protrudes upward to form a battery installation member 4 for mounting the battery 3, and the top of the battery installation member 4 is open to facilitate the connection of the control module 2 and the battery 3.

In this embodiment, the bottom of the battery installation member 4 is defined with an accommodating groove 5 for accommodating the battery 3. The raised battery installation member 4 not only can accommodate the battery 3 through the accommodating groove 5, but also can cooperate with a front wall of the base 1 to fix and limit the control module 2.

During assembly, first, the battery 3 may be mounted in the accommodating groove 5 by a screw, then the control module 2 is mounted in the base 1, and the control module 2 is connected to the battery 3.

Further, as an implementation solution, in this embodiment, a tunnel 6 is arranged on the battery 3, the tunnel 6 is located at one side of a middle line of the battery 3, and an interface connector 7 corresponding to the tunnel 6 is arranged on the bottom of the control module 2.

Considering that the current battery 3 is usually provided with a tunnel 6 at the central position, which is easy to connect the anode and the cathode. Therefore, in this embodiment, the tunnel 6 is configured to have an eccentric structure, that is, the tunnel 6 is arranged at one side of the middle line of the battery 3, the interface connector 7 corresponding to the tunnel 6 is arranged at a position corresponding to the bottom of the control module 2. This can prevent the anode and the cathode of the control module 2 and the battery 3 from being reversely connected, thereby improving the usage safety and service life.

During assembly, after the battery 3 is mounted in the accommodating groove 5 by the screw, the control module 2 is mounted in the base 1, and at this time, under the gravity of the control module 2, the interface connector 7 can be plugged into the tunnel 6 of the battery 3, so that the control module 2 is electrically connected to the battery 3, and the anode and the cathode are not reversely connected.

In another embodiments, the interface connector may also be arranged on the battery 3, wherein the interface connector is located at one side of the middle line of the battery 3, and the tunnel corresponding to the interface connector is arranged at the bottom of the control module 2.

Further, in this embodiment, a first waterproof sealing ring 8 is arranged around the tunnel 6, and a second waterproof sealing ring 9 is arranged around the interface connector 7.

wherein the first waterproof sealing ring 8 is made of a soft glue, the second waterproof sealing ring 9 is made of one or more circles of a hard glue, and the second waterproof sealing ring 9 presses against the first waterproof sealing ring 8 to achieve a waterproof effect.

Alternatively, the first waterproof sealing ring 8 is made of one or more circles of the hard glue, the second waterproof sealing ring 9 is made of the soft glue, and the first waterproof sealing ring 8 presses against the second waterproof sealing ring 9 to achieve a waterproof effect.

In this embodiment, preferably, the soft glue is silica gel.

Further, in this embodiment, a mounting portion 10 protrudes downwards from the bottom of the control module 2, and a mounting trough 11 for accommodating the mounting portion 10 is defined between the battery installation member 4 and an inner front wall of the base 1.

One side of the mounting portion 10 is a number "7"-shaped structure, the other side of the mounting portion 10 is an arc shape, and a front wall of the base 1 is a curved structure corresponding to the arc shape.

In this embodiment, the shape of the battery installation member 4 can be set to be a cuboid structure or a cube structure, one side of the mounting portion 10 is set to be a "7"-shaped structure, and the other side is set to be the curved structure corresponding to the arc front wall of the base 1, so that the mounting portion 10 can be assembled more stably and reliably, and the mounting portion 10 is prevented from shaking in the mounting trough 11.

The battery installation structure for the swimming pool robot of the present disclosure has the following beneficial effects. Through the above technical scheme, the present disclosure comprises the base, the control module and the battery, the control module is detachably mounted in the base, and the battery is detachably mounted at the bottom of the base, the battery is detachably connected to the control module, and the mounting portion for mounting the battery is formed by protruding upwards from the bottom of the base, the top of the mounting portion is open, and the bottom of the mounting portion is defined with an accommodating groove for accommodating the battery. The present disclosure not only has a reasonable spatial layout, facilitates installing and disassembling the battery and the control module, reduces production costs, but also prevents the control module from being reversely connected to the anode and the cathode of the battery, improving the usage security and the service life.

In order to achieve the described object, the present disclosure further provides a swimming pool robot. The swimming pool robot comprises the battery installation structure for swimming pool robot as described in the above embodiments. The structure and working principle of the battery installation structure for swimming pool robot have been described in detail above, and will not be repeated herein.

The above are only preferred embodiments of the present disclosure, and are not intended to limit the patent scope of the present disclosure. Any equivalent structural change made by using the description and the accompanying drawings of the present disclosure under the concept of the present disclosure, or direct/indirect application in other related technical fields, is included in the patent scope of protection of the present disclosure.

What is claimed is:

1. A battery installation structure configured for a swimming pool robot, the battery installation structure comprising:

a base;

a control module detachably mounted in the base; and a battery detachably mounted on a bottom of the base and detachably connected to the control module, wherein the bottom of the base protrudes upward to form a battery installation member, the battery installation member is configured for mounting the battery, and a top of the battery installation member is open, a bottom of the battery installation member is defined with an accommodating groove for accommodating the battery, wherein a tunnel is arranged on the battery, the tunnel is located at one side of a middle line of the battery, and an interface connector corresponding to the tunnel is arranged on a bottom of the control module;

wherein a first waterproof sealing ring is arranged around the tunnel.

2. The battery installation structure for swimming pool robot according to claim 1, wherein a second waterproof sealing ring is arranged around the interface connector.

3. The battery installation structure for swimming pool robot according to claim 2, wherein the first waterproof sealing ring is made of a soft glue, the second waterproof sealing ring is made of one or more circles of a hard glue, and the second waterproof sealing ring presses against the first waterproof sealing ring.

4. The battery installation structure for swimming pool robot according to claim 1, wherein a mounting portion protrudes from the control module, and a mounting trough configured for accommodating the mounting portion is defined between a wall of the battery installation member and a front wall of the base.

5. The battery installation structure for swimming pool robot according to claim 4, wherein a first side of the mounting portion has a longer length along the top of the mounting portion than along the bottom of the mounting portion in a direction perpendicular to the wall of the battery installation member, a second side of the mounting portion is an arc shape, and the front wall of the base is a curved structure corresponding to the arc shape.

6. A swimming pool robot, comprising a battery installation structure for the swimming pool robot, the battery installation structure comprising:

a base;

a control module detachably mounted in the base; and a battery detachably mounted on a bottom of the base and detachably connected to the control module, wherein the bottom of the base protrudes upward to form a battery installation member, the battery installation member is configured for mounting the battery, and a top of the battery installation member is open, a bottom of the battery installation member is defined with an accommodating groove for accommodating the battery, wherein a tunnel is arranged on the battery, the tunnel is located at one side of a middle line of the battery, and an interface connector corresponding to the tunnel is arranged on the bottom of the control module;

wherein a first waterproof sealing ring is arranged around the tunnel.

7. The swimming pool robot according to claim 6, wherein a second waterproof sealing ring is arranged around the interface connector.

8. The swimming pool robot according to claim 7, wherein the first waterproof sealing ring is made of a soft glue, the second waterproof sealing ring is made of one or more circles of a hard glue, and the second waterproof sealing ring presses against the first waterproof sealing ring to achieve a waterproof effect.

9. The swimming pool robot according to claim 6, wherein a mounting portion protrudes from the control module, and a mounting trough configured for accommodating the mounting portion is defined between a wall of the battery installation member and a front wall of the base.

10. The swimming pool robot according to claim 9, wherein a first side of the mounting portion has a longer length along the top of the mounting portion than along the bottom of the mounting portion in a direction perpendicular to the wall of the battery installation member, a second side of the mounting portion is an arc shape, and the front wall of the base is a curved structure corresponding to the arc shape.

* * * * *